United States Patent
Keppel et al.

(10) Patent No.: US 9,342,403 B2
(45) Date of Patent: May 17, 2016

(54) METHOD AND APPARATUS FOR MANAGING A SPIN TRANSFER TORQUE MEMORY

(71) Applicant: Intel Corporation, Santa Clara, CA (US)

(72) Inventors: David Pardo Keppel, Seattle, WA (US); Helia Naeimi, santa clara, CA (US); Jawad Nasrullah, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 14/228,555

(22) Filed: Mar. 28, 2014

(65) Prior Publication Data

US 2015/0278011 A1    Oct. 1, 2015

(51) Int. Cl.
G06F 11/10    (2006.01)

(52) U.S. Cl.
CPC .......... *G06F 11/106* (2013.01); *G06F 11/1016* (2013.01); *G06F 2212/68* (2013.01)

(58) Field of Classification Search
CPC .................................................. G06F 11/1076
USPC .................................................. 714/763, 764
See application file for complete search history.

(56) References Cited

U.S. PATENT DOCUMENTS

| 4,922,456 | A | * | 5/1990 | Naddor | G11C 16/102 365/185.09 |
|---|---|---|---|---|---|
| 8,775,865 | B2 | * | 7/2014 | Yang | G06F 11/106 711/103 |
| 2009/0235819 | A1 | * | 9/2009 | Brookman | B01D 47/021 95/185 |
| 2011/0289386 | A1 | * | 11/2011 | Yang | G06F 11/106 714/764 |

* cited by examiner

*Primary Examiner* — Fritz Alphonse
(74) *Attorney, Agent, or Firm* — Nicholson De Vos Webster & Elliott, LLP

(57) ABSTRACT

An apparatus and method for scrubbing spin transfer torque (STT) memory. For example, one embodiment of a apparatus comprises: a memory subsystem including at least one spin transfer torque (STT) memory, the STT memory arranged into one or more entries; and a scrub engine to ensure that the entries of the STT contain valid data, the scrub engine including analysis and processing logic to determine, for each entry, whether a specified scrubbing interval has expired and, if so, then to invalidate the entry or re-fetch data for the entry from a source and, if the scrubbing interval has not expired, then to perform error detection and/or correction on the entry.

32 Claims, 16 Drawing Sheets

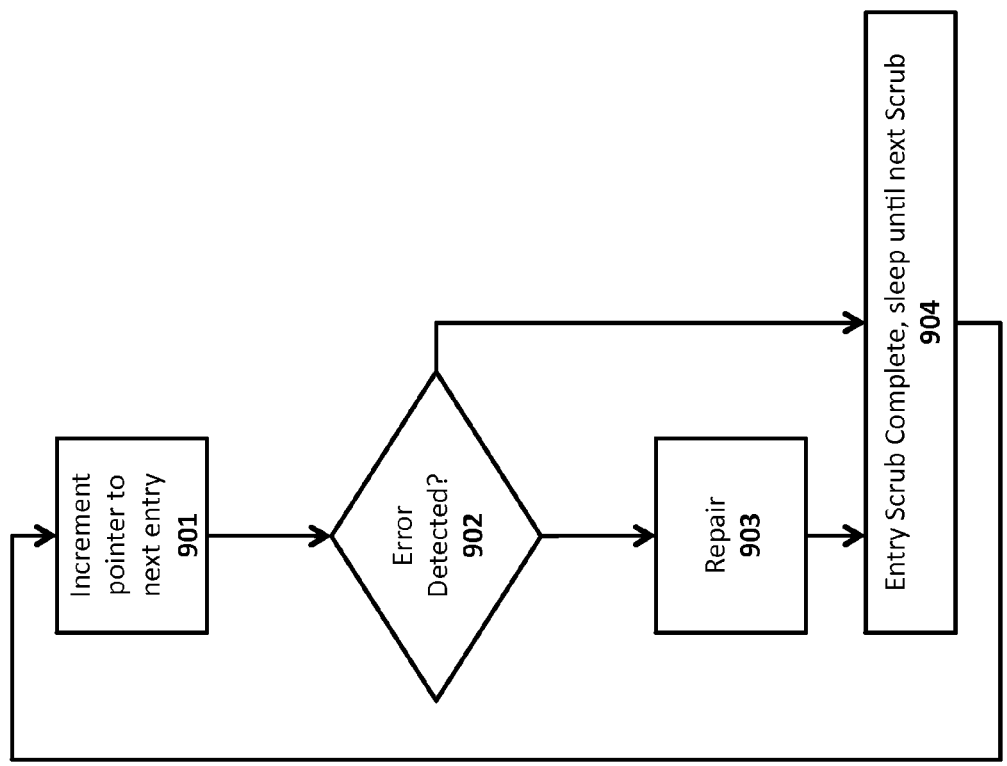

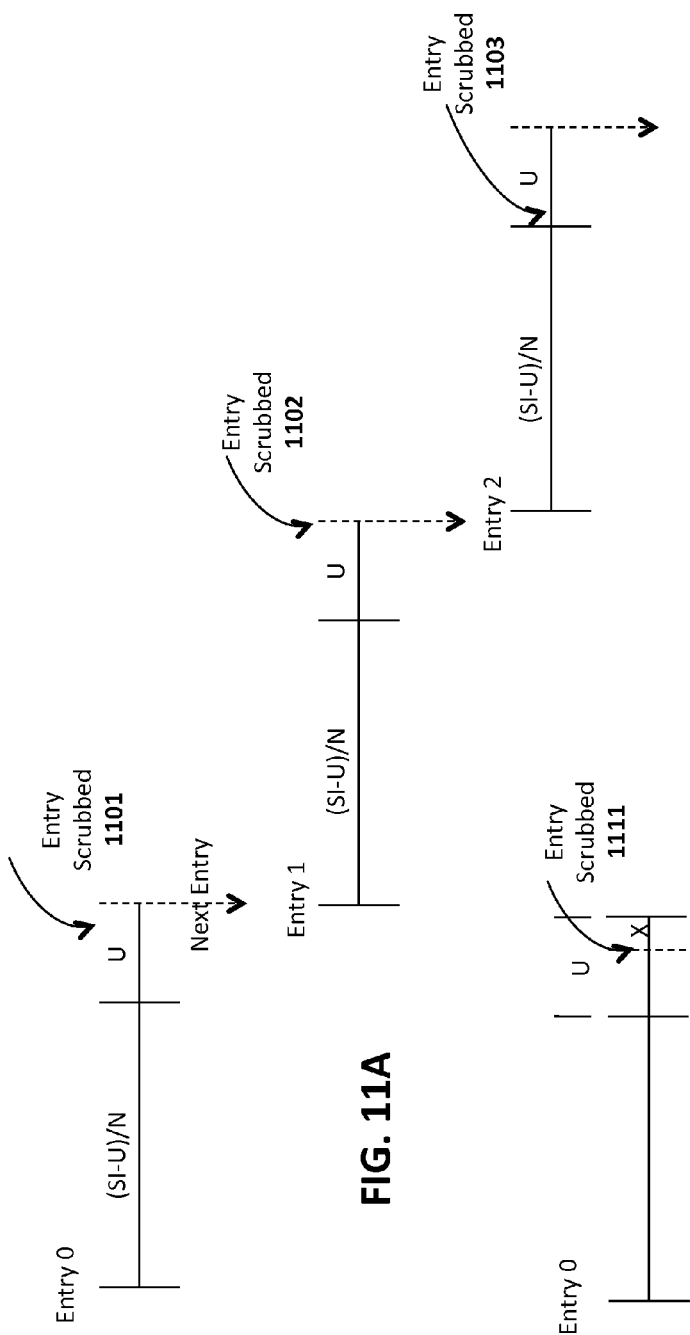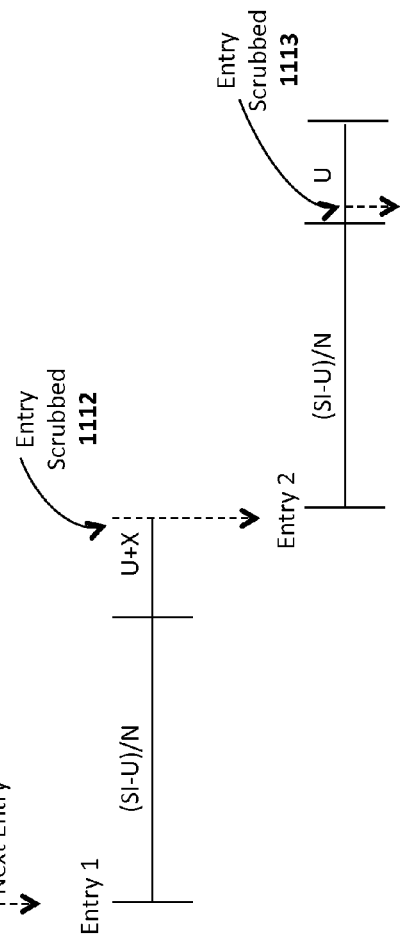
FIG. 11A
FIG. 11B

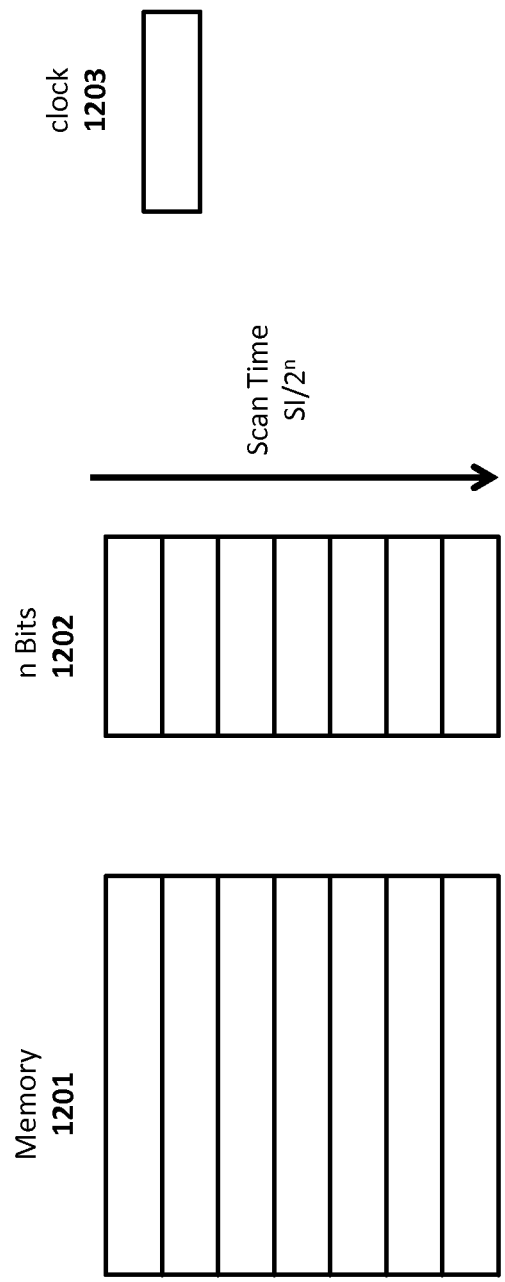

US 9,342,403 B2

METHOD AND APPARATUS FOR MANAGING A SPIN TRANSFER TORQUE MEMORY

BACKGROUND

1. Field of the Invention

This invention relates generally to the field of computer processors. More particularly, the invention relates to an apparatus and method for managing a spin transfer torque (STT) memory.

2. Description of the Related Art

Spin-transfer torque (STT) memory cells consists of an access transistor and a magnetic element which store data in the spin direction of each element. Data stored in the magnet is switched following the magnetic tunneling junction effect. Magnetic elements may be fabricated side-by-side with CMOS. STT memories have lower area and comparable read energy compared to other memory technologies but, depending on design, may have higher write energy and/or write times. Unlike CMOS memories, STT memories are non-volatile in that power can be removed and later reapplied without loss of data.

STT memories are "stochastic" devices in that errors can happen at any time. This is similar to errors in conventional CMOS/DRAM memories which are repaired by ECC, but STT memory has design tradeoffs between factors such as write energy, write time, memory size, design complexity, and error rates. In some STT memory configurations, error rates may be higher than with particle strikes. In particular, it may be desirable to accept higher error rates in exchange for improvements in other attributes. STT memories thus rely on ECC for normal operation, and perform a periodic "scrub" scan so recoverable (e.g., single-bit) errors are handled (e.g., repaired) before uncorrectable or undetectable multi-bit errors arise.

STT memory periodic scrubbing scans are superficially similar to DRAM refresh scans, but there are differences. First, a DRAM holds a value reliably for some interval RI, then the value is lost. In contrast, STT memories are always at risk of corruption: a bit value may be corrupted in the first cycle after it is written, and the longer a value is retained, the larger the risk of corruption. Corruption of a specific bit is not predictable, but follows a probability curve. The general goal of STT scrubbing is to find and repair corrupted values before so many bits are corrupted that repair (or even detection) is impossible. More frequent scrubbing improves the odds that all errors can be detected and repaired. The scrub rate is set based on STT technology, temperature, and design-time decisions about acceptable failure rates.

Second, a DRAM refresh always rewrites storage on every refresh. In contrast, STTs need to be checked regularly, but in the absence of errors, no write is required. When an error is detected, it may be a relatively slow and high-energy event; but in practice, designs with good multi-bit reliability also have very low single-bit error rates. Put another way, STT scrubbing is unlike DRAM refresh and so even STTs which have slow and high-energy writes and frequent scrubbing can work well for certain kinds of memories. Further, selective write is easy to implement for STT memories: when an error is detected, correction only needs to write corrected bits, reducing the energy to correct bit errors. Thus scrubbing energy is typically less than DRAM scrubbing energy.

Third, STT memory error rate is strongly dependent on temperature, and the "ideal" scrub rate varies by orders of magnitude. Error rates vary with details of the STT type and the memory cell design, but one sample cell shows a 50 degree Celsius drop in temperature allows about 100,000-fold reduction in scrub rate without reduced reliability.

A similarity to DRAM refresh is scrubbing needs to be timely, else error rates rise. This means in some scenarios that (as with DRAM refresh) STT scrubbing needs priority over ordinary reads and writes or there is data loss. Thus, STT scrubbing may hurt performance of ordinary reads and writes.

BRIEF DESCRIPTION OF THE DRAWINGS

A better understanding of the present invention can be obtained from the following detailed description in conjunction with the following drawings, in which:

FIG. 9A illustrates a prior art technique for detecting and repairing errors in a memory;

FIGS. 11A-B illustrate two different techniques for performing opportunistic scrubbing;

FIG. 12A illustrates an overview of one embodiment in which STT memory scrubs are scheduled while factoring in prior read operations;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
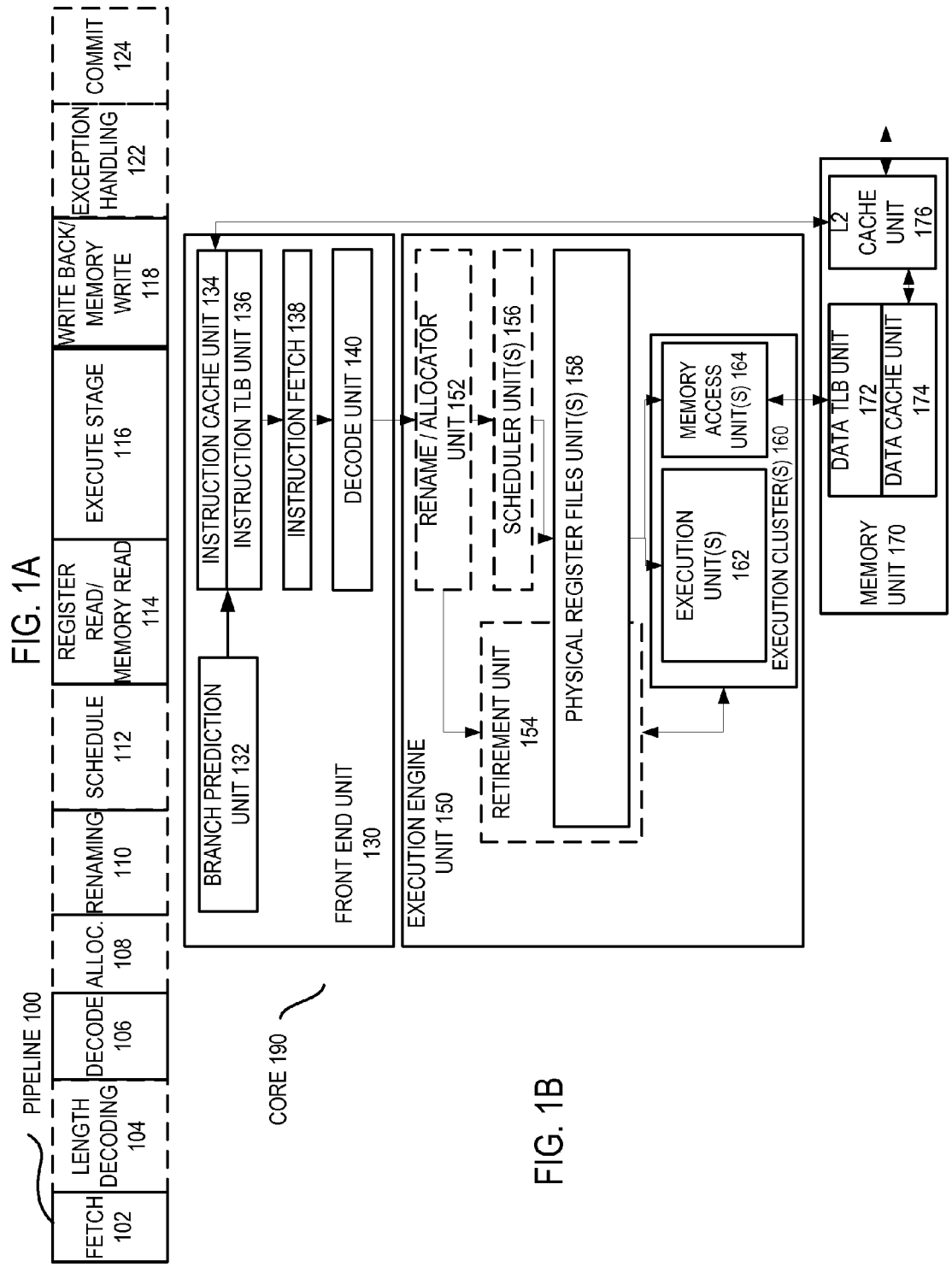
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
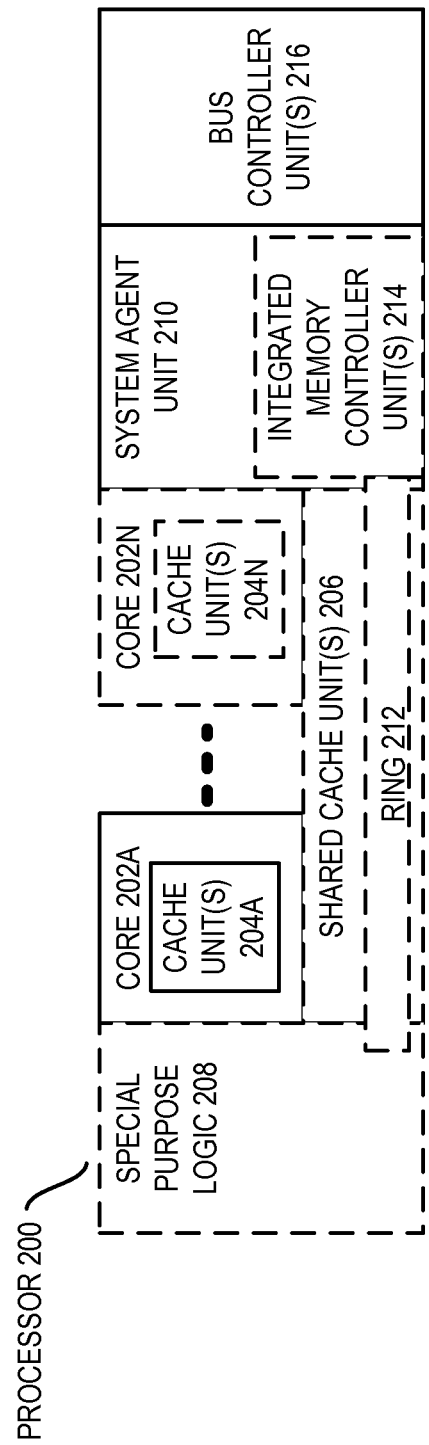
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
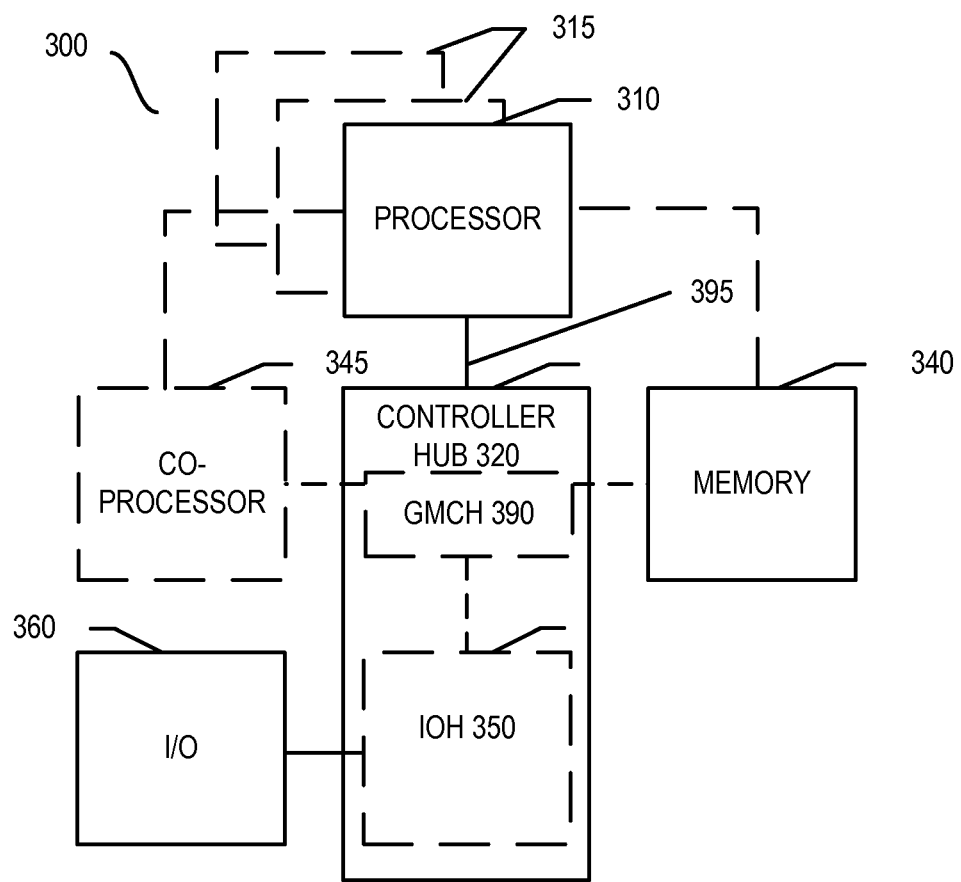
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
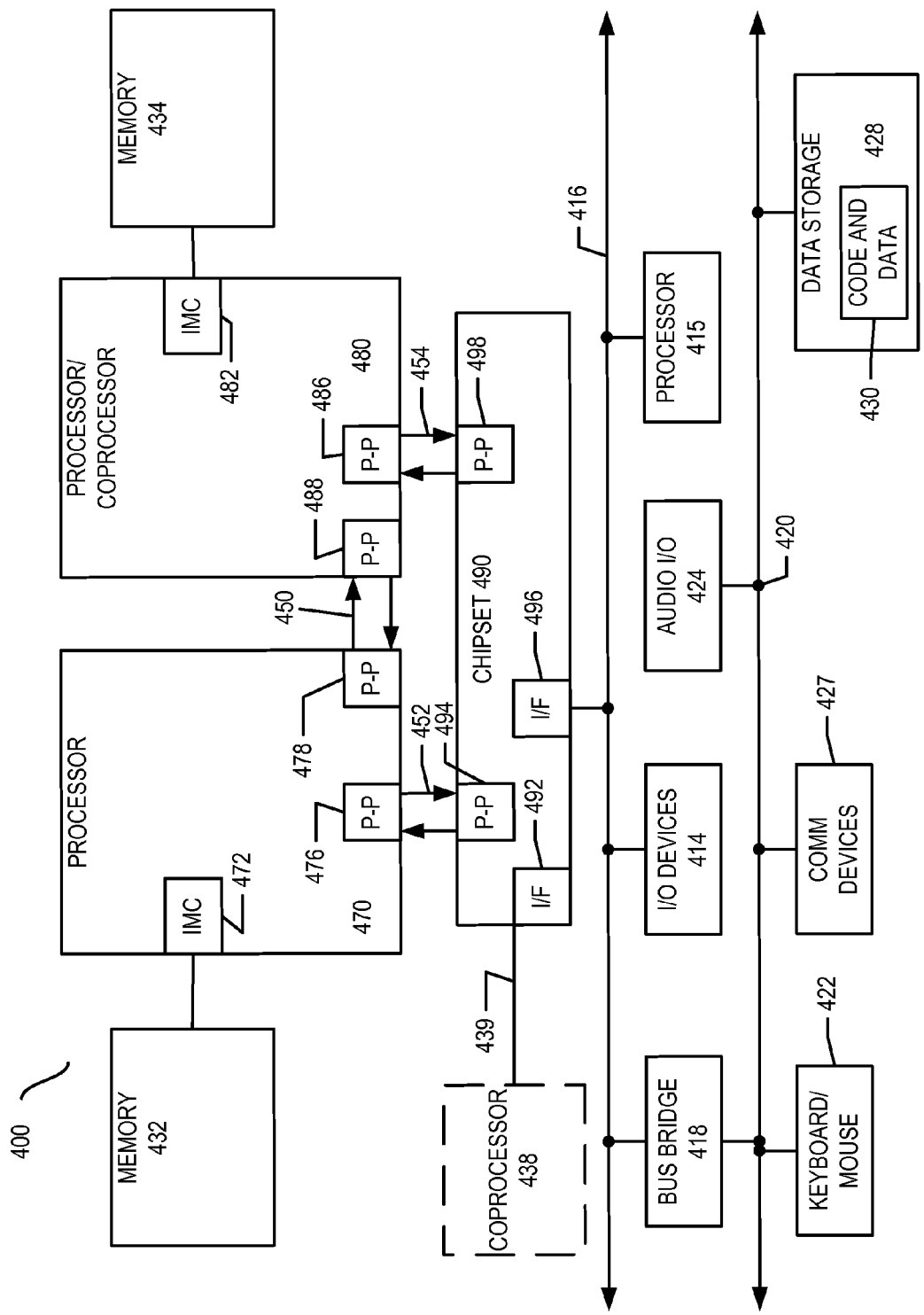
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
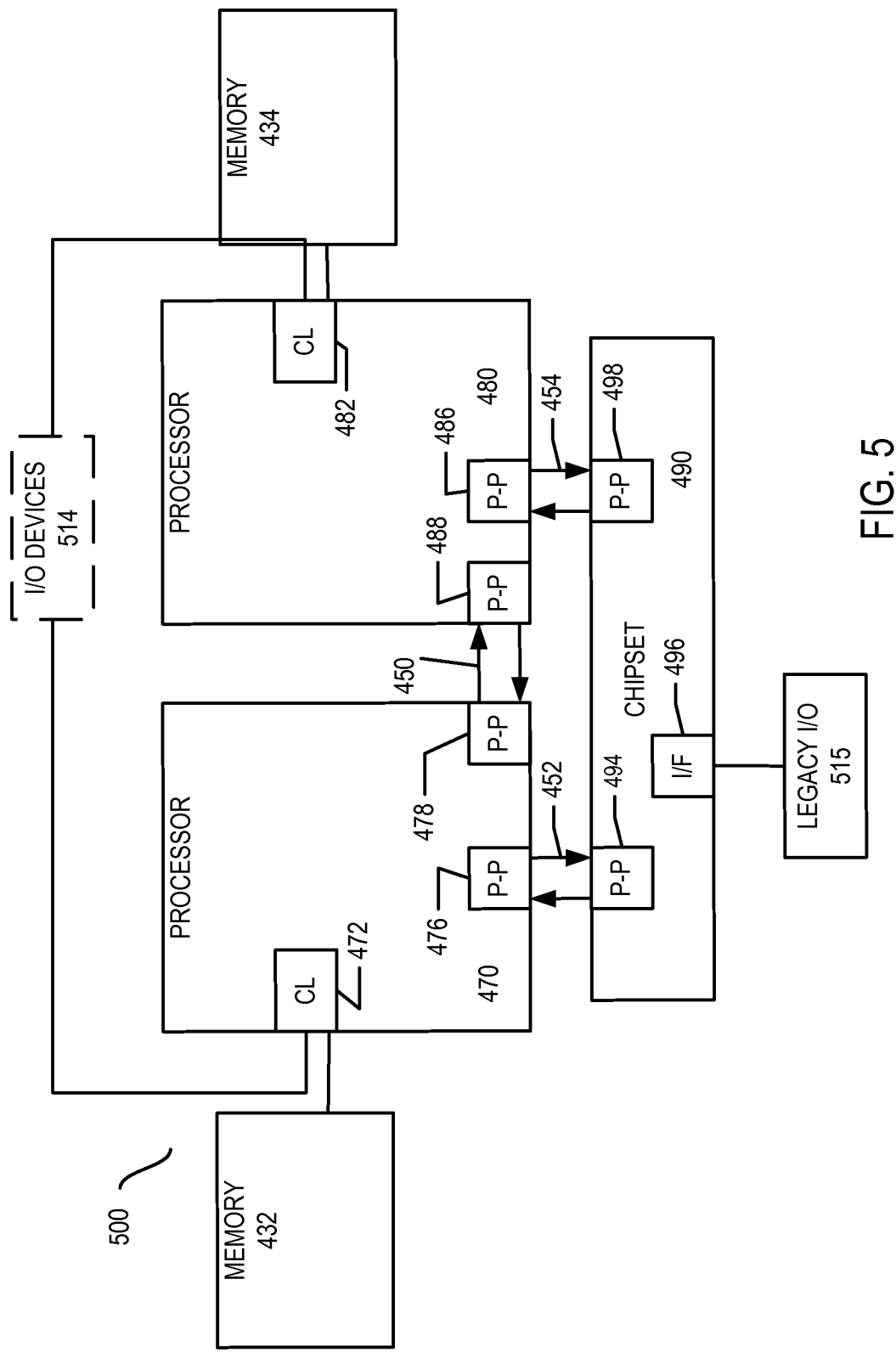
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
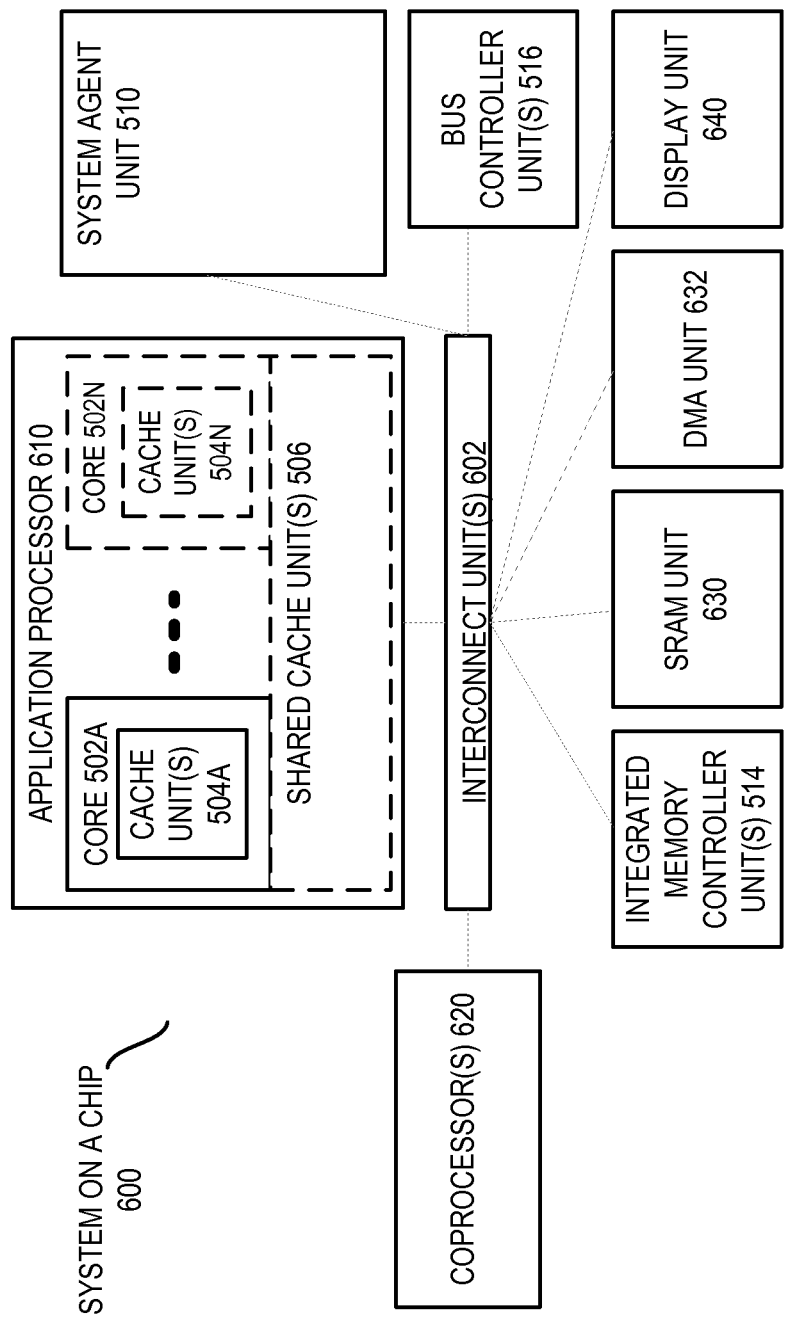
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
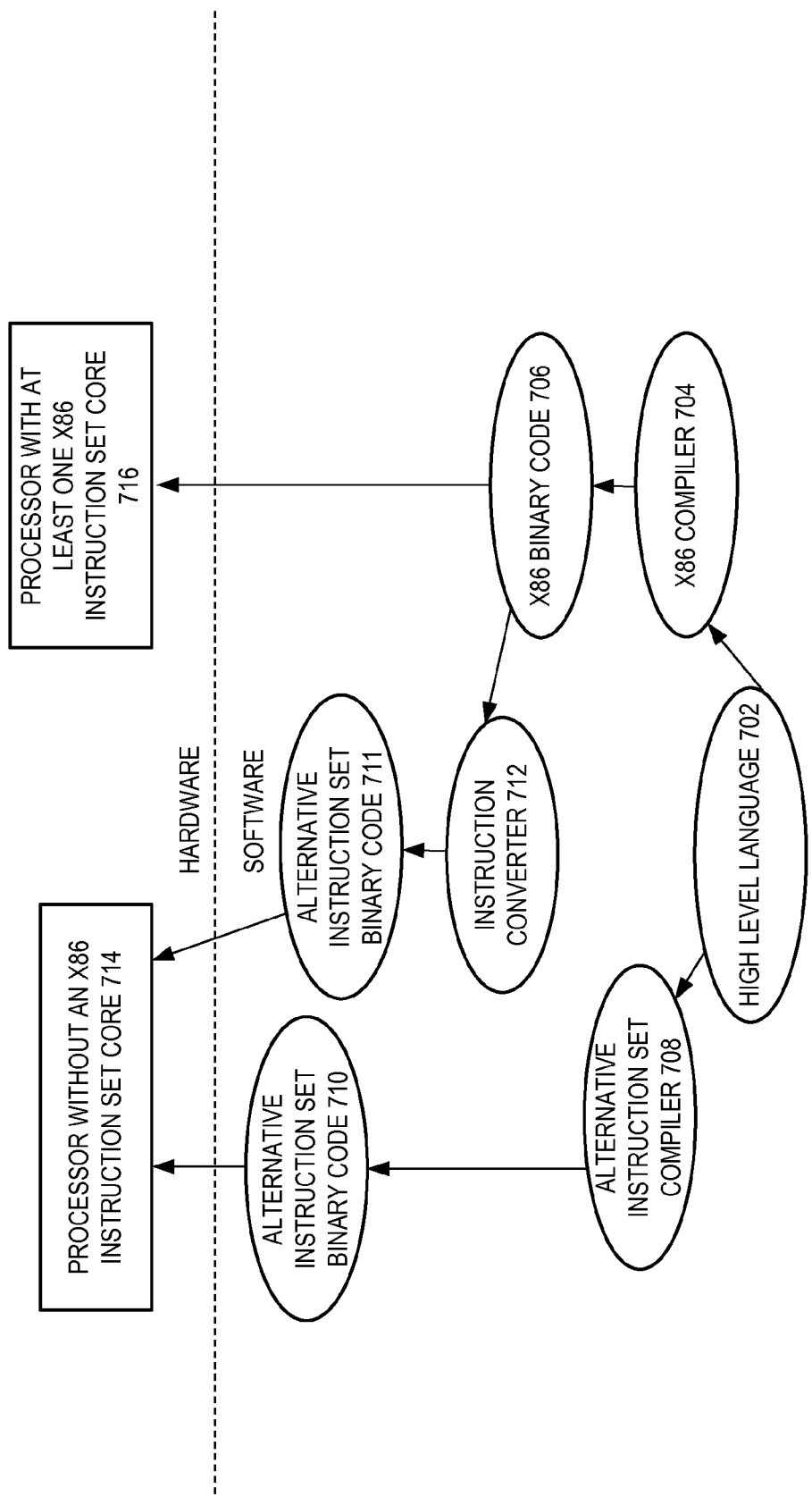
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Optimizing Spin Transfer Torque (STT) Memory Management As mentioned above, spin-transfer torque (STT) memory cells offer advantages over other memories, but also have costs and design issues not present with those other memories. For example, STTs require "scrubbing" to manage stochastic error processes inherent in STTs. The techniques described below include cache and memory design optimizations for structures built from STTs. In particular, a family of optimizations are described below to optimize STT scrubbing and improve memories built from STTs by (among other things): (1) exploiting non-volatile STT memory properties to improve sleep entry/exit times, while still dealing correctly with the "stochastic" nature of STT memories; (2) exploiting temperature-dependent properties of STTs to reduce energy use, both in normal operation and during sleep; and (3) exploiting special properties of certain cache types to reduce cache complexity and energy consumption related to "stochastic" errors and scrubbing processes. These described techniques enable the use of STTs in applications where straightforward use of STTs is impractical, and improve performance and efficiency in some other applications compared to straightforward use of STTs. Improvements include:

Certain embodiments of the invention reduce scrubbing-related overheads while maintaining data integrity. In particular, high scrub rates make it easier to find idle cycles in which to do scrubbing, but increase scrub energy. Conversely, low scrub rates save scrub energy, but make it more likely that scrubbing will interfere with normal access to the memory and effectively reduce the speed of the memory.

In one embodiment, the STT memories are implemented as processor caches such as translation lookaside buffers (TLBs), Level 1 (L1) caches, and/or Level 2 (L2) caches. Caches are used in different ways within a processor. In some applications, writes (e.g., data stores or cache misses) are relatively rare; most or all of the cache data is already as coherent as needed with the home location; and/or retaining the cache contents across power-managed states ("persistence") is a valuable attribute.

While certain embodiments of the invention are described below within the context of a TLB, the underlying principles of the invention may be implemented outside of the context of a TLB. For example, the same techniques described to manage a STT-based TLB may be used for other STT-based cache types such as a L1 cache or a L2 cache, or for any other type of memory in which the basic STT design constraints can be satisfied. Moreover, the underlying principles of the invention may be implemented with various different forms of TLBs. For example, certain computer systems may use a TLB to service I/O requests with less processor interference. The techniques described here are equally applicable to these non-core TLBs, as well as other memories.

Figure 8A:
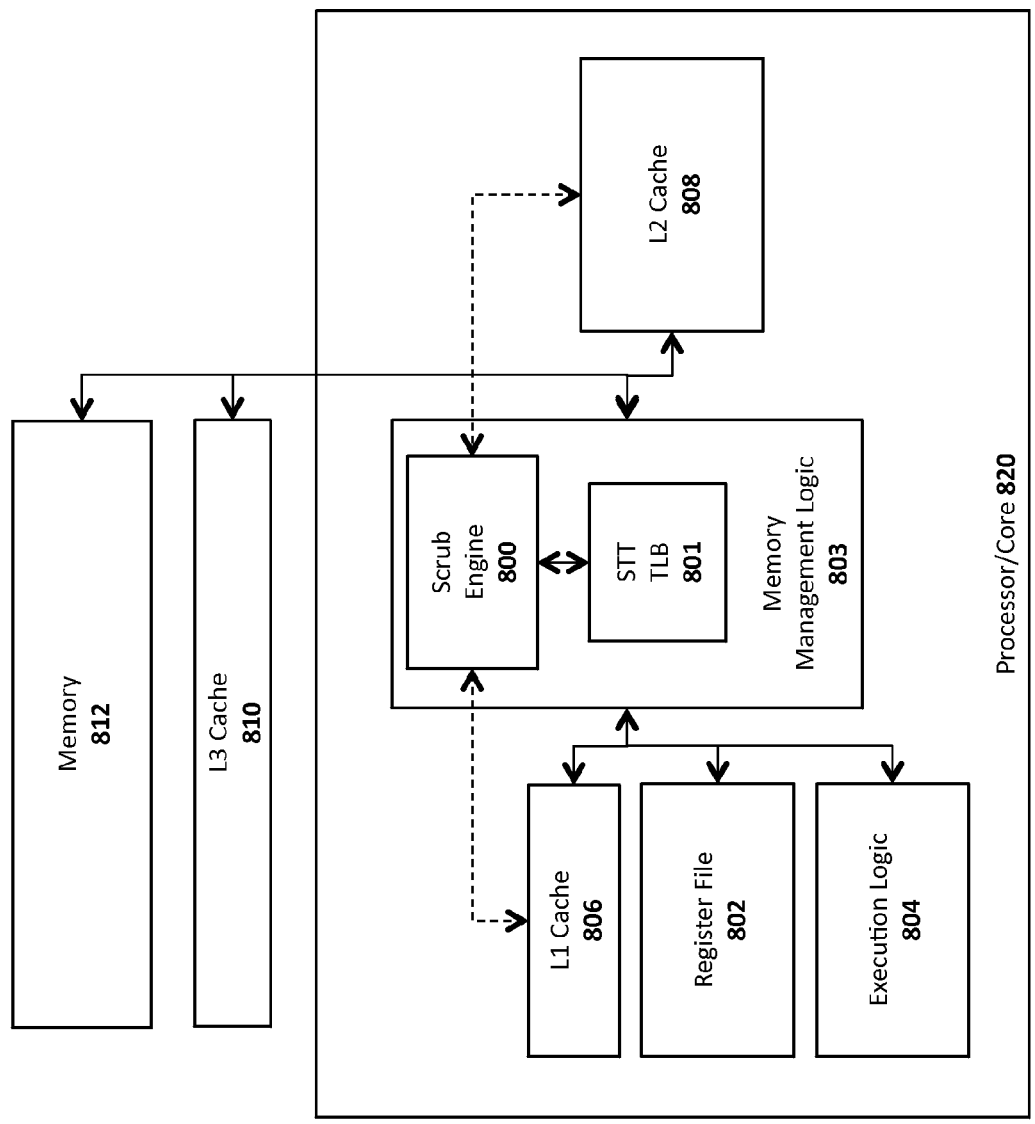
FIGS. 8A-B illustrates embodiments of an architecture on which the STT memory management techniques are implemented.

As illustrated in FIG. 8A, in one embodiment, the TLB 801 of a processor/core 820 is implemented with STT memory. The TLB 801 includes a plurality of entries, each containing a virtual-to-physical address mapping. Upon receiving a virtual address (sometimes referred to as a linear address) from the execution logic 804 of the processor/core 820, a memory management unit 802 initially translates the virtual address into its corresponding physical address using page table(s) stored in main memory 812. Because the page table(s) are stored in main memory 812, accessing the page tables is time consuming. To speed up the paging translations, the memory management logic 801 caches the most recently used translations in the TLB 801. Upon generating a virtual address requiring translation, the memory management unit 803 first searches for the translation in the TLB 801 before accessing the page table(s) in memory 812. If the translation is stored in the TLB 801, a TLB "hit" is said to have occurred and the TLB 801 provides the translation. However, if the translation is not stored in the TLB 801, a TLB "miss" is said to have occurred and a "page table walk" is invoked to access the page tables and provide the translation.

Thus, the TLB 801 has specific properties which make it a good fit for an STT implementation. For example, TLB writes due to misses are typically rare, so the speed loss and write energy due to misses is low. Further, extra energy and time to write the STT TLB 801 is easily hidden in the existing costs. The STT TLB 801 is written primarily to invalidate entries. Additionally, TLB cached entries are never "dirty"; that is, discarding a TLB entry is always permissible; if the value is needed it can always be fetched from the home location. In one embodiment, the STT TLB 801 shown in FIG. 8A is implemented using STT memory, while the other components (e.g., the caches 806, 809, scrub engine 800, etc) are not. In one embodiment, the various interconnections between components shown in FIG. 8A are used to control TLB accesses and scrub operations using one or more of the techniques described herein (e.g., delaying TLB accesses when a STT TLB scrub has priority over TLB accesses).

While a single integrated TLB is illustrated in FIG. 8A for purposes of explanation, processors 820 commonly use both L1-instruction and L1-data TLBs and may include multiple TLBs in each case to support multiple page sizes. For example, processors may have both a large set-associative TLB for 4 KB pages and a small fully-associative TLB for other page sizes. Thus, in one embodiment, the underlying principles of the invention described herein are implemented with respect to multiple TLBs spread across multiple cores.

For the sake of completeness, the illustrated processor/core 820 also includes a register file 802 for storing addresses and data to be processed by the execution logic 804. The processor/core 820 further includes a memory subsystem comprising the memory management logic 803; a dedicated Level 1 (L1) cache 806, a Level 2 (L2) cache 808, and a Level 3 (L3) cache 810 for caching instructions and data according to a specified cache management policy (e.g., implemented by the memory management logic 803); and a system memory 812. The L1 cache may include a separate instruction cache for storing instructions and a separate data cache for storing data. The instructions and data stored within the various processor caches are managed at the granularity of cache lines which may be a fixed size (e.g., 64 or 128 Bytes in length). These processor components are well understood by those of skill in the art and will not be described here in detail to avoid obscuring the underlying principles of the invention.

In one embodiment, TLB coherency is managed by system software. It is a common operation for system software (typically the operating system) to update the home location of TLB mapping data, yet allow the processor to continue operating without updating the TLB with the latest version of that mapping data. When a "stale" TLB entry is incorrect, system software is required to explicitly update the TLB. By far the most common mechanism is to simply invalidate the corresponding entry/entries so a later use of the value result in a TLB miss. Since TLB coherency is managed by software, there is no need to wake a processor during sleep in order to ensure TLB coherency.

TLB misses are handled by a "page table walk", and even with special hardware accelerators, TLB misses often take hundreds of cycles, sometimes thousands of cycles. In some scenarios, TLB misses may represent 20% of the total time spent to wake from a sleep state and resume full-speed execution. It is thus desirable to retain TLB state across sleep states to improve restart time.

The TLB is used as an example herein because it's properties make it a good candidate for STT implementation. However, other types of memories and caches which exhibit some of these properties may also be used. Design extensions for other types of memories which may benefit from an STT implementation are described following the detailed description of the TLB.

Figure 8B:
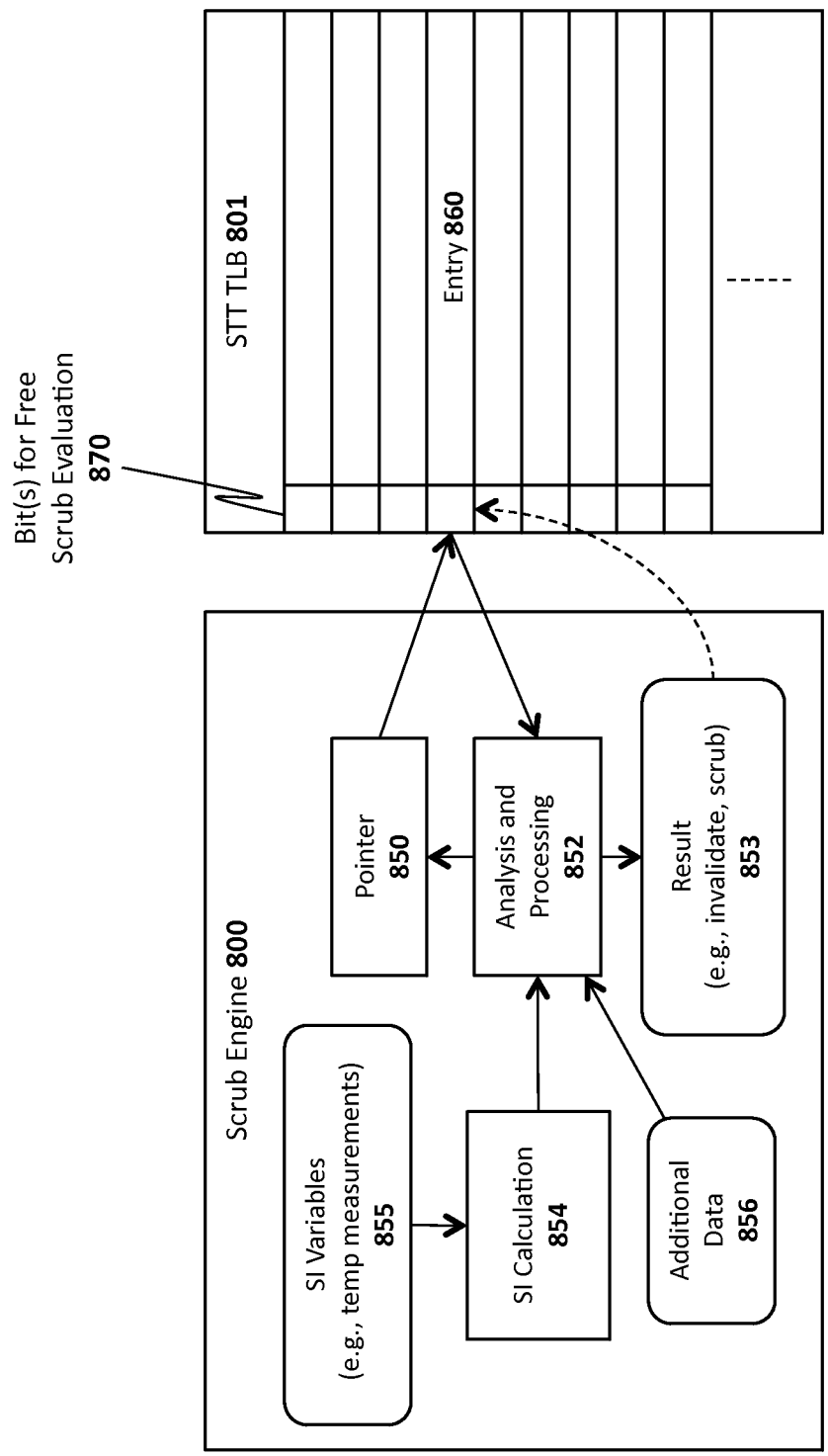

In one embodiment, a scrub engine 800 manages the STT-based TLB 801 using the techniques described herein. As illustrated in FIG. 8B, in one embodiment, the scrub engine 800 includes a pointer 850 which points to the current entry to be analyzed and processed by analysis and processing logic 852 to generate a result 853. As discussed below, the "result" may include writing the selected entry 860 back to the TLB 801 (e.g., if the entry has been modified during error correction), detecting an error in the entry, correcting the error, invalidating the entry, and/or explicitly causing the entry to be re-fetched from its source (e.g., main memory 812).

In one embodiment, the pointer 850 is incremented periodically to move to the next entry based on a current scrub interval (SI) specified by SI calculation logic 854. As discussed in detail below, the SI may be calculated based on variables 855 such as measured temperature, voltage, current, and/or processor workload. As discussed below, additional data 856 may be used by the analysis and processing logic 852 to determine the result 853 such as the estimated time since the entry 860 was read, and the size of a current "guard band," and the status of processor sleep states. In one embodiment, the SI is also based on the design parameters for the STT memory. That is, based on design/construction of one STT may respond differently to changes in temperature, voltage, current, and/or processor workload than another STT (having a different design/construction). Thus, in one embodiment, these design parameters are factored in when determining SIs for the STT memory.

A. Error Detection and Repair

In conventional error correction code ("ECC") systems, errors are detected and repaired. ECC requires both state and circuitry, which contribute to area and energy overheads, and reduces the advantage of using STT memory cells. For a TLB and for some other caches, data is always "clean," and it is always correct to invalidate a cache entry and re-fetch it. Error detection is typically simpler than error correction, and may use less state or circuitry (chip area and energy). The discussion below refers broadly to detection schemes with or without correction as "ECC," but calls out specifically "detection" when referring to detection without correction.

One embodiment of the invention adds a second category of errors, referred to as "timeout" errors, which occur when a scrub operation was not run within the scrub interval (SI). The entry associated with the timeout error may be valid, but there may have been enough bit errors in the entry that ECC can no longer detect errors. Thus, in one embodiment, the value is presumed to be incorrect.

ECC errors are rare, but a system may need frequent scrubbing to avoid errors. Scrubbing costs energy and scrubbing reads may interfere (conflict) with other uses of the memory. One embodiment of the analysis and processing logic 852 dynamically chooses between scrubbing overheads and timeout errors. In some cases, it avoids timeout errors entirely by guaranteeing all entries are checked within the interval SI. In other cases, it slows or stops the scrub process and allows some or all of the memory cells to have timeout errors. Some of these cases are discussed below.

One embodiment of the analysis and processing logic 852 provides two new alternatives for handling errors. Rather than performing an ECC repair, one new approach is to simply mark the TLB 801 entry invalid. If a later request attempts to use the invalid entry, the normal TLB miss process will read in the correct value. Although reloading a TLB entry is expensive, if the rate of reloads is rare, the energy cost and speed loss may be negligible. A second new approach is to re-fetch the entry, which still has energy costs, but starting the re-fetch before a miss may hide some or all of the latency. Re-fetching requires an address; in general, either the tag (address) or data may have been corrupted. One approach is to only re-fetch on a valid tag. If it is unclear whether tag or data was corrupted, a second approach is to assume the tag is valid and re-fetch, provided it is harmless to do so (e.g., re-fetching the wrong entry does not lead to a machine check error or application page fault).

Using invalidation or re-fetch may reduce the amount of storage or logic needed for ECC, as it is generally less storage and circuitry to detect errors than to repair them. A hybrid approach is to repair ECC errors which are one or a few bits (the most common case) while invalidating or re-fetching uncorrectable errors.

FIG. 9A illustrates a conventional scrubbing approach which steps through entries, repairing as needed using ECC. At 901, the scrub engine pointer is incremented to point to the next entry. If an error is detected at 902, then the entry is repaired using ECC at 903. At 904, the entry scrub is complete and the process sleeps and/or moves to the next entry.

Figure 9B:
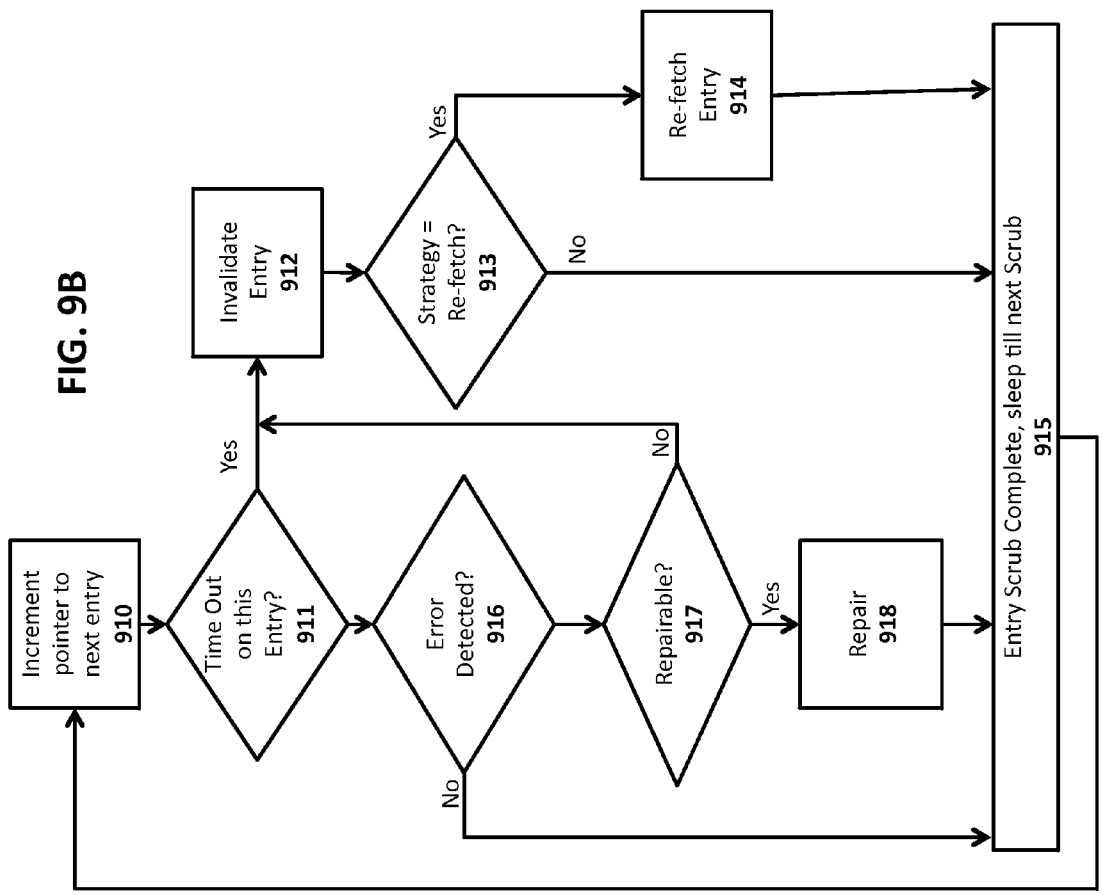
FIG. 9B illustrates one embodiment of a method for managing cache entries within an STT-based cache.

FIG. 9B illustrates one embodiment of a method for managing a STT memory which uses two repair strategies: either mark the entry invalid, or re-fetch. The illustrated method may be implemented by the analysis and processing logic 852 shown in FIG. 8B. However, the underlying method may be implemented within the context of various other processor architectures and memories.

At 910, a pointer identifying entries within the STT memory is incremented to point to the next entry within the TLB (or other cache/memory). At 911, a determination is made as to whether a timeout has occurred on the current entry. For example, if the SI interval has passed, then it may be assumed that the entry is invalid. If so, then the entry is invalidated at 912. If a re-fetch strategy is employed, determined at 913, then the entry is re-fetched from its source at 914 (e.g., read from system memory). If not, then the entry scrub process is complete at 915.

Returning to 911, if a timeout has not occurred, then at 916 error detection is performed to determine whether an error exists in the entry. If not, then the process completes at 915. If so, then a determination is made as to whether the error can be repaired (e.g., using ECC techniques). If so, then the error is repaired at 918 and the entry is updated. If not, then the process returns to 912 and the entry is invalidated.

B. Scrubbing Conflicts

Suppose the STT scrub rate requires every STT memory location has a scrubbing interval of SI time units. A straightforward scrub mechanism is a clock which steps through STT memory at a fixed rate. For example, suppose 1,000 cache entries and SI=10,000 cycles. One approach is every 10 cycles the clock should check another location. Another approach is that the clock can wait 9,000 cycles and then do 1,000 back-to-back cycles of scrubbing. In one embodiment, the analysis and processing logic 852 performs one or more of these clocking operations for updating the pointer 850 and scheduling scrubbing operations.

TLBs are often accessed frequently, making it likely a straightforward scrubbing mechanism will interfere with normal TLB reads and hurt performance. For example, if the TLB is read 80% of all cycles, and if a read for scrubbing is required 10% of all cycles, then roughly 8% of all normal TLB reads will be delayed by scrubbing reads. Invalidation and re-fetch are expensive, so it is desirable to scrub and repair usually and invalidate/re-fetch rarely. At the same time, TLB read speed is critical to performance, so it is desirable to avoid stalling reads for scrub and repair.

In one embodiment, the analysis and processing logic 852 performs two optimizations to reduce conflicts, referred to herein as idle scrubs and free scrubs. A given system may use one, both, or none depending on the cache type and current usage.

1. Idle Scrubs

A first optimization is to note TLB reads are frequent, but there are often processor stalls or other intervals where there are no TLB reads. Thus, the analysis and processing logic 852 can scrub opportunistically (earlier than required) if the TLB is otherwise idle and thus typically avoid conflicting with ordinary reads. If no idle slots are found by the end of some "window" then a conflicting scrub is performed to guarantee scrubs are always performed in a timely manner.

For example, if SI=10,000 and the TLB has 10 entries, an ideal clock forces scrubs every 1,000 cycles; but forcing exact times will often conflict with ordinary TLB reads. An alternative employed in one embodiment of the invention is to start looking for a free slot (no TLB read) at, for example, 890 cycles. If an idle slot is found, the scrub is performed. At 990 cycles, if no idle scrub has occurred, one is forced (causing a conflict). Then, the "clock" updates the pointer 850 and advances to the next entry. This causes a slightly higher rate of scrubs (entries are scrubbed on average every 9,900 cycles, although SI=10,000) but gives a 100-cycle window to find an idle slot and perform a no-conflict scrub.

Figure 10:
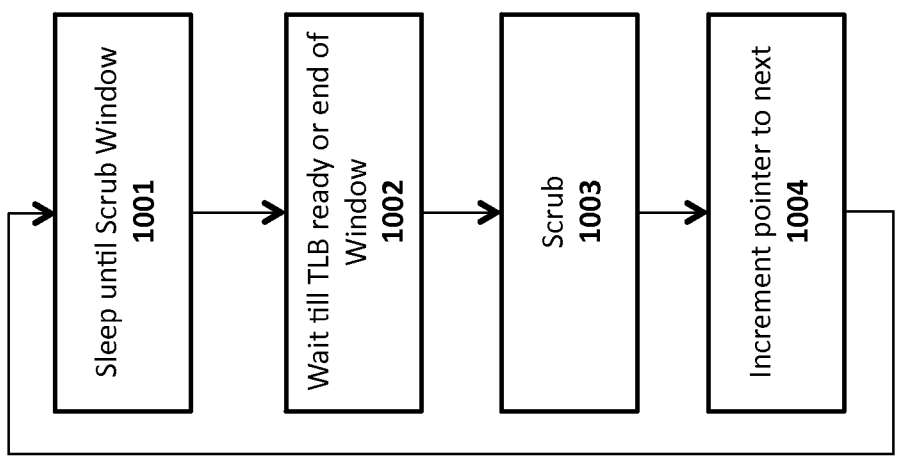
FIG. 10 illustrates one embodiment of a method for scrubbing STT memory.

FIG. 10 illustrates one embodiment of a method for performing opportunistic scrubbing operations. At 1001, the scrub engine sleeps until the defined scrub window is reached. At 1002, the scrub engine starts looking for a free slot in which to perform a scrub of the current entry. If one is available, then it performs the scrub operation immediately. If no free slot is found by the end of the scrub window, then a scrub is forced (causing a conflict). At 1003, the scrub operation is performed and at 1004, the pointer is incremented to point to the next entry and the process starts again at 1001.

The analysis and processing logic 352 may perform windowing in several ways. FIG. 11A shows a design based on a fixed interval per entry with indicators 1101-1103 showing the points at which scrubbing is performed for Entries 0-2, respectively. There is an uncertainty window U within which the scrub may occur. Therefore, the time to scrub all entries must be slightly reduced. For example, Entry 0 might be scrubbed at the beginning of U on one scrub cycle and at the end of U on another. Thus, the overall scrub cycle is reduced by U.

FIG. 11B shows an alternative in which an "early" scrub in one entry can contribute the remaining time X to a sliding "window" which gives more time for scrub arbitration of a following entry. Indicators 1111-1113 show the point at which scrubbing occurs for Entries 0-3, respectively. In this example, scrub is done X before the end of U and so some amount up to X is contributed to the next scrubbing interval.

The scrub cycle time for FIG. 11A is fixed at (SI-U)/N, where U is the uncertainty window and N is the number of entries in the cache. In contrast, the scrub cycle time for FIG. 11B is variable. If the TLB is largely idle, then the scrub interval is reduced according to the amount of X carried forward, but if the TLB is busy, the scrub rate approaches SI/N despite having a large arbitration window. Note, the approach in FIG. 11B requires some loop-carried state, but not per-entry state.

As a further refinement, an early scrub for an entry may be used as a "guarantee," but the analysis and processing logic 852 continues to arbitrate for a later scrub still in the interval U. If successful, the entry is rescrubbed and a longer scrub cycle time can be used; if there is no free cycle, it advances to scrub another entry, using the earlier scrub guarantee and correspondingly shorter scrub cycle time.

A larger scrubbing window provides more opportunities for a free cycle scrub and so reduces scrubbing interference with normal reads and writes. However, a larger scrubbing window also increases the frequency of scrubbing and so increases energy consumption. It is advantageous to select scrubbing window based on typical access patterns. Thus, in one embodiment, the analysis and processing logic 852 tracks how often TLB reads are blocked by scrubbing, and adjusts the scrubbing window to balance scrubbing energy against the rate of interference with ordinary reads. If TLB reads are rarely blocked, the scrub window is reduced, though not to exceed the scrub interval SI. Conversely, if TLB reads are frequently blocked, the scrub rate is increased, although the combined rate of normal reads and scrubbing reads cannot exceed 100%.

2. Free Scrubs

A second optimization skips scrubs when a given location has been read recently since ordinary reads perform an ECC check. If reads are concentrated in just a few locations, most locations still need to be explicitly scrubbed, so there is little savings. If reads are fairly broad, free scrubs eliminate many explicit scrubs.

One implementation of the optimization allows all scrubs to be delayed for each memory until exactly SI after the last read. However, this requires a complex scrub engine and significant state per line. The following describes a simplified scheme.

One embodiment employs a global Boolean G which switches between true and false every SI/2 cycles. In addition, a Boolean value 870 (see FIG. 8B) is added per TLB entry. When a TLB entry is read, the per-line Boolean is assigned the current value of G. The analysis and processing logic 852 is configured to check the per-entry Boolean every SI/2 cycles. If the line Boolean and global G agree, the line has been read and checked within the last SI/2 cycles. Since a scrub runs every SI/2 cycles, there will be another scrub check not more than SI/2 cycles in the future, so the scrub may be safely skipped. Although illustrated as integrated within the TLB 801 in FIG. 8B, the per-line Boolean 870 may be physically separate from the TLB; may be implemented in some different technology (e.g., a CMOS memory); and may be designed so reading for scrub check and updating it for TLB reads do not conflict (e.g., updates are on one phase (half-cycle) and reads on the other phase).

A more complex version operates on similar principles but further sub-divides the SI interval by using 2 or more bits for the interval. Suppose a 2-bit global which takes on values 00, 01, 10, 11, 00, ... in a never-ending cycle. Each TLB entry has two bits 870 and on an access the current global clock is written to the per-line bits. The analysis and processing logic 852 scans all entries every SI/4 cycles. If the per-line value is less than 3 steps from the current global, the scrub can be skipped (i.e., because it has not been more than $3/4*SI$ since the last read/check and it will be not more than $1/4*SI$ until the next guaranteed check). If the per-line value is 3 steps (e.g., will wrap in the next interval) then the scrub must be performed in the next $1/4*SI$ cycles. In general there is a tradeoff that finer intervals require more storage, faster check rates and more timely scrubbing (e.g., $1/4*SI$ "window" for scrubbing instead of $1/2*SI$ "window") but coarser intervals increase rates of scrub interference because fewer "free" scrubs occur in, say, $1/2*SI$ than in $3/4*SI$.

Figure 12B:
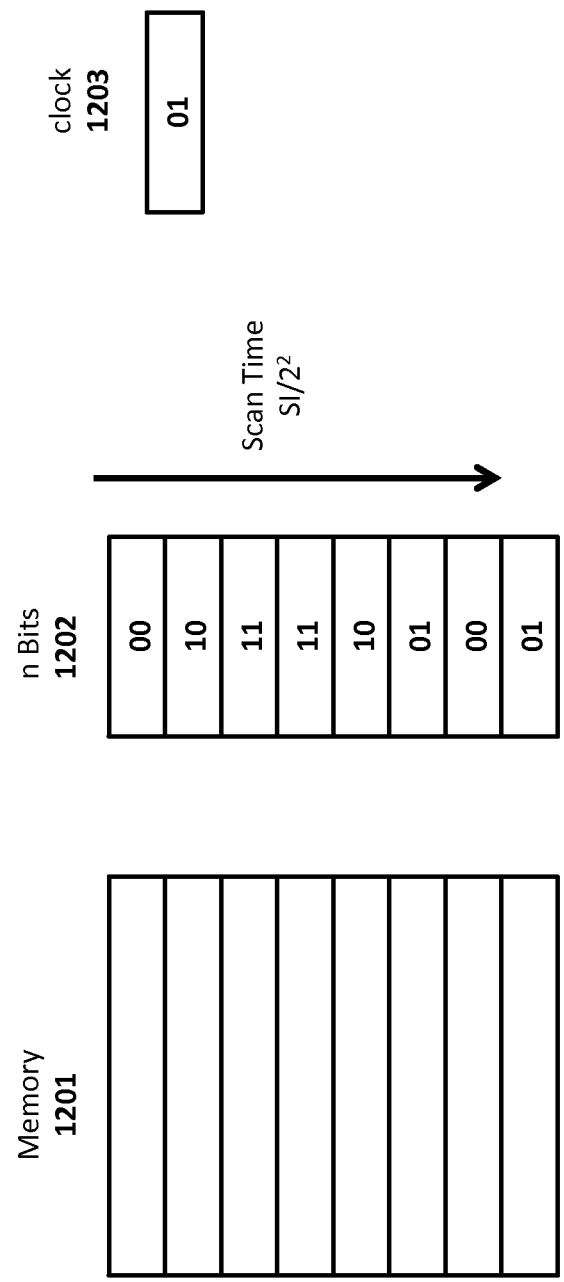
FIG. 12B illustrates specific details of one embodiment in which STT memory scrubs are scheduled while factoring in prior read operations.

FIG. 12A shows the general concept schematically with a memory 1201 comprising a plurality of entries, n bits 1202 associated with each entry and a clock 1203 which moves through the different possible values of the n bits. As indicated, the scan time for this embodiment is $SI/2^n$. FIG. 12B shows a specific embodiment in which n=2. In this example, values marked 01, 00, and 11 do not need to be scrubbed, but values marked 10 have not been read for a long time and do need to be scrubbed within the next SI/4 cycles. In the next clock interval, entries marked 11 will need to be scrubbed, but there is some chance they will be accessed and thus "scrubbed for free" in the meantime.

"Scrub" is a relatively low-energy operation (no data is written unless an error is found), so doing scrubs more often than necessary is a good trade-off when it avoids interference with ordinary reads or reduces timeouts. In general, it is desirable both to maximize "free" scrubs and to minimize the rate of work by the scrub engine. If the rate (benefit) of "free" scrubs is low, it is desirable to turn it down or turn it off for some period on the basis the energy cost is reduced with only slightly higher read interference. Conversely, if read interference increases, it may be desirable to turn on or turn up checking for "free" scrubs, on the basis high interference hurts performance and energy efficiency.

C. Temperature-Dependent Scrub Rates

STT scrub rates vary greatly with temperature. In one STT memory design, dropping temperature by 50 degrees Celsius increases the scrub interval, SI, about 100,000 times. One embodiment of the invention optimizes scrub rates by monitoring temperature and/or other variables known to contribute to temperature (e.g., voltage, current, core workload, etc) and adjusting scrub rates as needed. This is shown in FIG. 8B as SI variables (e.g., temperature) 855 being used by SI calculation logic 854 to determine a current SI. Although illustrated as a separate module in FIG. 8B, the SI calculation module 854 may be implemented as logic within the analysis and processing logic 852. In such a case, the SI variables 855 would be provided directly to the analysis and processing logic 852 which would then perform the SI calculations. The underlying principles of the invention are not limited to any particular arrangement of logic within the scrub engine 800.

In general, circuit temperature drops are harmless in that lower temperatures decrease the scrub rate (increase the scrub interval), so delayed response to lower temperature may increase energy use compared to ideal (scrubs more often than needed), but does not introduce errors. In contrast, circuit temperature increases are dangerous in that a rise in temperature requires faster scrub rates in a timely manner or undetected errors may occur. One embodiment of the scrub engine deals with increasing temperatures using four mechanisms: (1) a temperature guard band; (2) high-priority scrubs; (3) preemptive increases to the guard band and scrub rates; and (4) introducing timeout errors based on the elevated temperature.

A temperature "guard band" performs scrubs more often than needed for the current temperature. It thus allows modest temperature increases without missing scrubs. Since scrub rates vary greatly with temperature and scrub energy is reduced using longer scrub intervals, it is especially desirable to minimize the guard band when scrub rates are high. When scrub rates and scrub energy are low, a larger guard band may be used without significantly more energy.

In one embodiment, when temperature increases quickly, a special "high-priority scrub" is performed to avoid missed scrubs. For example, if the temperature is low and the scrub interval is 1010 cycles, but then temperature rises quickly to a scrub interval of 105 cycles, data is retained as long as all locations are scrubbed within 105 cycles of the time when the temperature rises. High-priority scrubs may interfere with normal accesses; if the rate of high-priority scrubs goes up, the guard band is increased.

In one embodiment, the guard band (scrub rates) are also increased pre-emptively, on the basis of rising temperature and other variables/events 855, such as an upward adjustment of the voltage regulator or increased current output from the regulator. Conversely, as temperature stabilizes, the guard band may be reduced.

When temperature increases suddenly, scrubs for some entries may be missed entirely. As previously described, this leads to "timeout" errors, which are handled by discarding and re-fetching the TLB contents. For example, if a sudden rise in temperature means the scrub interval has gone from 10,000,000 cycles to 10,000 cycles, even a high-priority scrub may not be able to scrub all entries in a timely manner, as some entries may have been approaching 10,000,000 cycles since the last scrub when the temperature increased, and since temperature sensors often are based on sampling (making it difficult to compute the interval exactly, thereby necessitating a conservative SI value). In this scenario, some entries might be scrubbed, but any which cannot be scrubbed are "promoted" to timeout. The ability to promote to "timeout" makes it possible to use a smaller guard band.

Each of the above mechanisms has energy/error tradeoffs. Using all four mechanisms allows aggressive reduction in typical scrub rates and energy, while typically avoiding the time and energy overheads due to sudden thermal transients.

Figure 13:
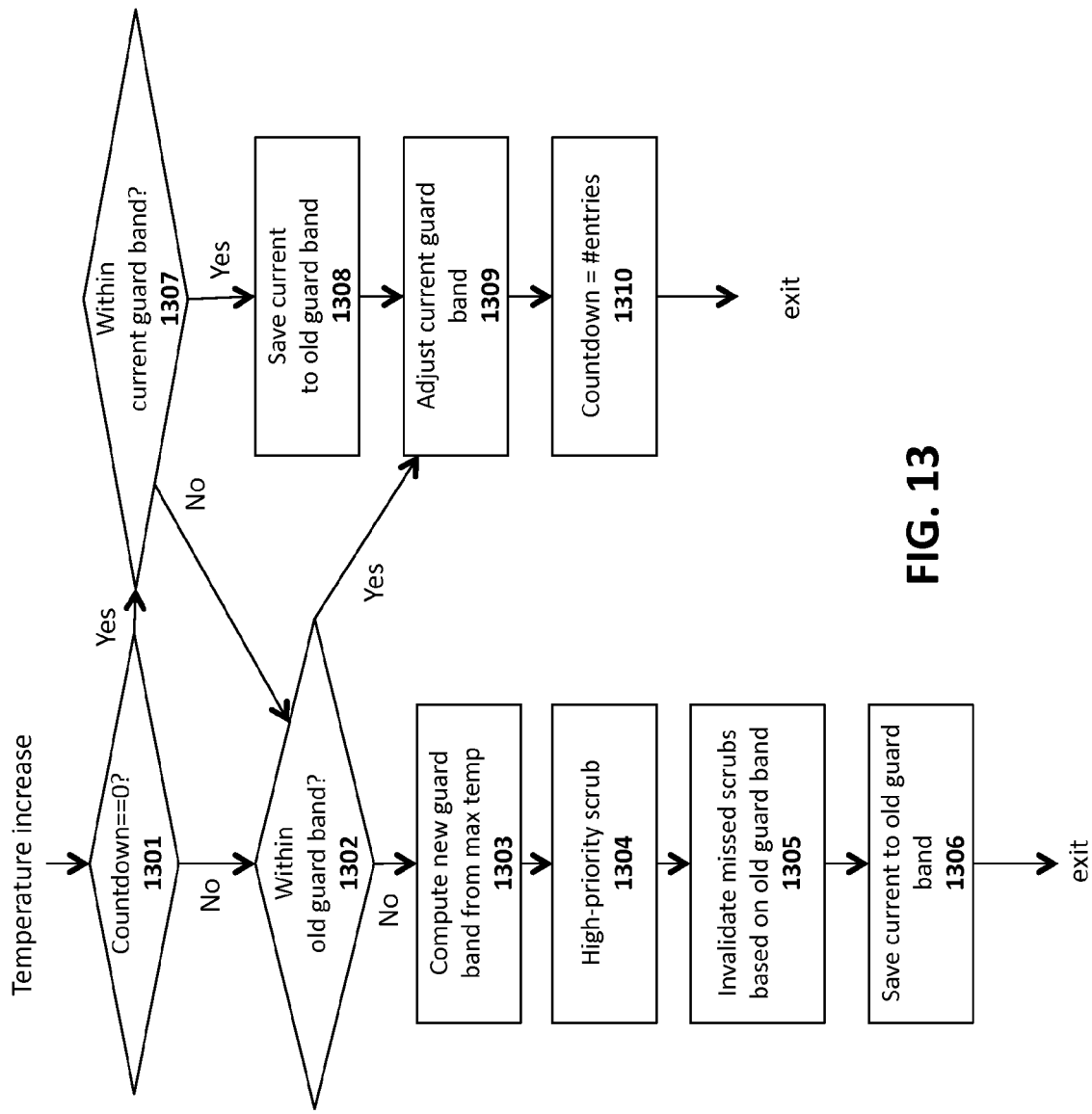
FIG. 13 illustrates one embodiment of a method for adjusting scrub operations in response to temperature changes.

FIG. 13 illustrates one embodiment of a method using a combination of guard band, high-priority scrubs, and invalidation (timeout). In one embodiment, the method starts when the temperature changes. The "countdown" is the number of entries to be scrubbed under the current guard band, and is decremented each time a scrub is performed. If the countdown is zero, determined at 1301, this means no guard band update is in progress; if countdown is nonzero, some entries are expecting to be scrubbed under the earlier (colder, longer) scrub interval, and so the system must be more conservative in determining timeouts. If the countdown is not 0, then as long as the new temperature is within the oldest guard band in effect, determined at 1302, simply switching to a new guard band at 1309 (based on the maximum temperature) and continuing on will still scrub all entries within the required interval. At 1310, the countdown is set equal to the number of remaining entries.

If the new temperature exceeds the current guard band at 1302 then, at 1303, the new guard band is computed based on the maximum temperature and, at 1304, a high-priority scrub is invoked for the remaining entries (e.g., each entry is scrubbed as quickly as possible and/or using a high priority scrubbing protocol such as described herein). Ideally, all entries which need to be scrubbed with high priority are reached within the required interval but, in practice, the system must assume accelerated errors under the higher temperature; thus, even high-priority scrubs will miss some entries, which are invalidated at 1305. For example, using high priority scrubs, it may take 1000 cycles to scrub all entries given the new temperature but the scrubbing operation would need to be completed in 900 cycles to scrub each entry within the required time period. In such a case, the entries which have yet to be scrubbed at the end of 900 cycles are invalidated at 1305. At 1306, the current guard band is saved to the old guard band such that the old guard band is known the next time the process is repeated (as the result of another temperature increase).

Turning back to 1301, if the countdown is equal to 0, then there are no additional entries to be scrubbed. At 1307 a determination is made as to whether the system is operating within the current guard band. If so, then the current guard band is saved to the old guard band at 1308. If not, then the process returns to 1302 and a determination is made as to whether operation is within the old guard band. The remaining portions of the process operate as discussed above.

D. Sleep States

Normal component operation transitions between "active" and "sleep" states. Sleep states are used when the processor is idle and can dramatically reduce energy consumption compared to remaining idle at full operating voltage. Sleep states reduce energy use and so tend to reduce operating temperature. As mentioned, STT memory cells have a scrub rate that depends on temperature. One embodiment of the invention optimizes the cache and scrub process based on temperature to reduce energy use and error rates.

By way of example, assume that the TLB has been busy and is hot, and then the processor temporarily runs out of work and sleeps. Over a few seconds, the temperature of the processor may often drop dramatically, from close to 100 degrees Celsius to close to room temperature. The following optimizations may be employed for sleep states.

As noted above, TLB contents are always "clean" and may be correctly discarded at any time. In one embodiment, the analysis and processing logic 852 optimizes sleep operation by retaining TLB contents for short sleep intervals, but optionally discarding the TLB contents for sleep intervals over a specified duration (e.g., over SI). For example, one embodiment of the scrub engine 800 includes a "for sleep" operation that quickly steps through all entries to do one last scrub on every line of the TLB 801 before entering sleep. On wake-up, any entry which can be scrubbed before SI expires is scrubbed and retained. Any entry which cannot be scrubbed within SI is discarded. There may be conflicts between TLB access and wake-up scrub. Since re-fetching is typically expensive in time and energy, one embodiment of the scrub engine 800 temporarily blocks execution to maximize the number of entries which can be scrubbed.

The interval SI increases greatly as a circuit cools. As mentioned, for one modeled memory, cooling by 50 degrees Celsius increases SI by about 100,000 times. In one embodiment, this characteristic is used by the scrub engine 800 to optimize sleep by waking briefly to run some scrub cycles, then re-entering sleep. As the circuit cools, the SI interval increases, and so by tracking temperature, scrub rates can be reduced as the circuit cools; often, the longer the sleep, the lower the average scrub cost. Further, in one embodiment, the TLB 801 and scrub engine are placed in a power domain that is a subset of the processor and so can be powered on without waking the entire processor, thereby further reducing the energy cost of scrub operations.

Sleep intervals are generally unpredictable. A sleep interval may be a few microseconds or a few hours. For long sleep intervals, restart performance is often less critical and energy savings are more critical. in one embodiment, the scrub engine 800 optimizes for this condition by noting when sleep times get very long (e.g., past a specified threshold) and switching off the wake-to-scrub operation described above. This reduces sleep energy at the expense of higher wake-up costs. When and whether to switch off scrub may be based on temperature: if the component is near room temperature, then SI is long and scrub energy is low even for a very long sleep; if the component is stopped but being heated by other components on the die, then SI is short and the average scrub energy is high.

When the temperature is used by the SI calculation module 854 to adjust SI, temperature monitoring should continue even when the component is off. This ensures correct operation in the case where the "sleep" and "wake" temperatures are low but an external heat source raises the temperature in-between. These temperature rises reduce the required SI and must be evaluated when dealing with "timeout" errors.

One embodiment of the scrub engine 800 uses two approaches to deal with temperature rises during sleep: (1) the circuit may be woken "early" and serviced as described above; and (2) the scrub interval SI may be reduced according to the temperature profile during sleep. On wake-up, the reduced scrub interval is used for determining timeout errors, rather than the scrub interval that was in-force when the TLB 801 was put to sleep.

Note that local heating transients during normal operation of the STT-based TLB 801 may be very fast. However, once power is removed from the TLB for sleep, it will not typically have fast local heating transients, and thermal transients from external sources tend to be relatively slower. Thus, relatively slow periodic temperature checks may be performed which are sufficiently accurate and reduce energy used in temperature measurements. Alternatively, it may be advantageous to use the slowness of thermal transients to reduce the guard band (described above) and, in turn, reduce the typical rate of scrubs closer to the theoretical optimum.

Some "system" events often precede temperature increases, so these events may be used to pre-emptively increase the guard band and reduce the frequency of undesirable high-priority scrubs and timeout errors. As an example, dynamic voltage/frequency scaling (DVFS) is a technique used to improve efficiency under light load and performance under heavy load. When a DVFS transition increases voltage and frequency, it is very likely because load is increasing which will likely result in a temperature rise. Thus, even before temperature rises, such "correlated" events can trigger STT scrub management changes such as high-priority scrubs and/or increased guardband, thus reducing the risk of relatively more-expensive events such as timeout errors. Broadly, scrub rates depend on temperature, and changes in power management, idleness, temperature of adjoining circuits, or other such changes can be used to trigger changes in STT scrubbing to reduce scrubbing overheads such as the guard band when the system is stable, but also reduce scrubbing overheads such as high-priority scrubs and timeout errors during temperature changes.

E. Other Caches and Memories

As mentioned, the TLB 801 is used above as a working example because it is well-matched to an optimized STT implementation. However, other cache and memory types may also be able to take advantage of an STT-based implementation and some of the optimizations above.

By way of example, an instruction cache (e.g., an L1 instruction cache) has properties broadly similar to a TLB. It tends to have more entries but the miss cost is lower and the rate of cache misses is higher. In some common processor designs, the instruction cache coherency is controlled by software, as with TLB coherency. In other common processor designs, writes to a memory location will invalidate any copy in the instruction cache so the next read from the instruction cache will miss and fetch the updated value. Such snoops are typically rare, but must be handled correctly across sleep states. One approach used in data caches is "wake on snoop," also called a sleep cell. The instruction cache typically reads from the level-2 data cache, so in the case of "wake on snoop" for an instruction cache line, the instruction cache may be woken to also service the snoop. A second approach is a coherency "queue," which is a small circuit that records snoops so on wake-up they can be serviced before any reads are allowed. A coherency queue can be used on the instruction cache, driven from a level-2 cache using sleep cells; or if the level-2 cache uses a coherency queue, the same queue can drive both the level-2 and instruction cache coherency operations.

A level-2 data cache often has significant "dirty" data, but much lower write rates than a Level-1 data cache and much better tolerance for long write times of STT memory cells. For sleep states, it may be desirable to "clean" the cache so that it can use some of the optimizations above. Cleaning can be done opportunistically, in anticipation of a sleep transition; at entry to the sleep state; or even lazily after sleep entry by performing writebacks on wake-up. State saves may be done piecemeal (e.g., started opportunistically and finished lazily).

Caches may be divided in to multiple power domains. For example, caches built around "sleep cells." Where a sub-domain of a cache has only clean data, it may be a good candidate for transition to a more efficient mode (one that allows data loss even where other parts of the cache have dirty data and must remain in a less-efficient mode to prevent data loss).

The embodiments of the invention may also be used with hybrid cache designs, for example using CMOS for fast-changing values and promoting slow-changing values to STT. In hybrid cache designs, the STT portion of the cache may benefit from the optimizations described here even though the overall cache has high write rates or other properties that are not suitable for STT. In a hybrid cache design it may be desirable when entering sleep to move some values from CMOS to STT memory cells. For example, suppose a data cache with 2 ways of CMOS memory and 2 ways of STT memory. It may be desirable to move most-recently-used entries to STT ways when going to sleep, so that on wake-up the values are already cached and ready to use, rather than keeping just the STT entries which happen to be there, which are more likely to include many least-recently-used entries, thus needing re-fetch of most-recently-used values from the home location.

General memories do not tolerate timeout errors, but do have scrub rates which vary dramatically with temperature and are sometimes amenable to the optimizations described herein which reduce scrubbing conflicts.

The embodiments of the invention described herein provide numerous benefits to existing processor-based implementations. For example, these embodiments enable reduced-power and faster sleeps; the use of STT memories instead of ordinary CMOS memories, to take advantage of STT's smaller area, lower idle power, and stochastic zero-power retention; and reduced energy and overhead compared to straightforward STT memories. These embodiments also enable construction of STT memory structures with small net scrubbing overheads compared to standard CMOS structures, but exploiting STT memories' inherent smaller area, lower idle power, and stochastic zero-power retention. Thus, these techniques reduce energy/overhead compared to standard STT memory implementations.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   a memory subsystem including at least one spin transfer torque (STT) memory, the STT memory arranged into one or more entries and associated with a scrubbing interval; and
   a scrub engine to ensure that the entries of the STT contain valid data, the scrub engine including analysis and processing logic to determine, for a given entry, whether the scrubbing interval has elapsed and, if so, then to invalidate the given entry or re-fetch data for the given entry from a source and, if the scrubbing interval has not elapsed, then to perform error detection and/or correction on the given entry.

2. The apparatus as in claim 1 wherein the scrub engine further comprises:
   scrub interval calculation logic to calculate a current scrubbing interval based on at least a current or anticipated temperature of the STT memory.

3. The apparatus as in claim 1 wherein the STT memory is implemented as a translation lookaside buffer (TLB) within the memory subsystem, and wherein the entries are TLB entries containing virtual-to-physical address translations.

4. The apparatus as in claim 1 wherein the STT memory comprises a Level 1 or Level 2 cache within the memory subsystem.

5. The apparatus as in claim 4 wherein the cache comprises an instruction cache.

6. The apparatus as in claim 1 further comprising:
   a pointer to be incremented by the analysis and processing logic to point to a current entry to be processed.

7. The apparatus as in claim 1 wherein the analysis and processing logic will attempt to perform its operations on an entry opportunistically, by waiting for a clock cycle in which the STT memory is idle.

8. The apparatus as in claim 7 wherein performing operations opportunistically comprises searching for an opportunity to perform operations on the entry at a first point in time prior to the end of the scrubbing interval, wherein if the operations cannot be performed by the end of the scrubbing interval or a second point in time prior to the end of the scrubbing interval, then the operations are forced, potentially causing a conflict if the STT memory is not idle.

9. The apparatus as in claim 1 wherein the analysis and processing logic is to determine whether an operation needs to be performed on an entry based, at least in part, on how recently that entry has been read.

10. The apparatus as in claim 9 wherein if the entry has been read sufficiently recently, then the entry is skipped by the analysis and processing logic.

11. The apparatus as in claim 10 further comprising:
    a clock for periodically sequencing through different possible values of one or more bits, wherein each entry, upon being read, is assigned a current value from the clock, and wherein the analysis and processing logic reads the clock at a later time to determine whether the entry has been read sufficiently recently.

12. The apparatus as in claim 1 wherein the scrubbing interval is set to include a temperature guard band so that memory scrub operations are performed more often than required for a current temperature.

13. The apparatus as in claim 12 wherein in response to detecting an increase in temperature, the analysis and processing logic performs one or more high priority scrub operations to perform error detection and/or correction on the entries within the guard band and performs invalidations and/or re-fetch of data outside of the guard band.

14. The apparatus as in claim 13 wherein the analysis and processing logic modifies the guard band based on the current temperature or anticipated changes in temperature.

15. The apparatus as in claim 1 wherein the scrubbing interval is set, at least in part, based on sleep states entered by the apparatus.

16. The apparatus as in claim 15 wherein setting the scrubbing interval based on sleep states comprises waking periodically to scrub the STT memory to retain data and/or switching from scrubbing the STT memory to a timeout.

17. A method implemented within a memory subsystem including at least one spin transfer torque (STT) memory, the STT memory arranged into one or more entries, the method comprising:
    specifying a scrubbing interval based, at least in part, on an error rate of the STT memory;
    determining, for a given entry of the STT memory, whether the specified scrubbing interval has elapsed;
    if the specified scrubbing interval has elapsed, then invalidating the given entry or re-fetching data for the given entry from a source; and
    if the scrubbing interval has not elapsed, then performing error detection and/or correction on the given entry.

18. The method as in claim 17 further comprising:
    calculating a current scrubbing interval based, at least in part, on a current or anticipated temperature of the STT memory.

19. The method as in claim 17 wherein the STT memory is implemented as a translation lookaside buffer (TLB) within the memory subsystem, and wherein the entries are TLB entries containing virtual-to-physical address translations.

20. The method as in claim 17 wherein the STT memory comprises a Level-1 or Level-2 cache within the memory subsystem.

21. The method as in claim 20 wherein the cache comprises an instruction cache.

22. The method as in claim 17 further comprising incrementing a pointer to point to a current entry to be processed.

23. The method as in claim 17 further comprising:
    attempting to perform operations on an entry opportunistically, by waiting for a clock cycle in which the STT memory is idle.

24. The method as in claim 23 wherein performing operations opportunistically comprises searching for an opportunity to perform operations on the entry at a first point in time prior to the end of the scrubbing interval, wherein if the operations cannot be performed by the end of the scrubbing interval or a second point in time prior to the end of the scrubbing interval, then the operations are forced, potentially causing a conflict if the STT memory is not idle.

25. The method as in claim 17 further comprising:
    determining whether an operation needs to be performed on an entry based, at least in part, on how recently that entry has been read.

26. The method as in claim 25 wherein if the entry has been read sufficiently recently, then the entry is skipped.

27. The method as in claim 26 further comprising:
    a clock for periodically sequencing through different possible values of one or more bits, wherein each entry, upon being read, is assigned a current value from the clock, and wherein the analysis and processing logic reads the clock at a later time to determine whether the entry has been read sufficiently recently.

28. The method as in claim 17 wherein the scrubbing interval is set to include a temperature guard band so that memory scrub operations are performed more often than required for a current temperature.

29. The method as in claim 28 wherein in response to detecting an increase in temperature, performing one or more high priority scrub operations to perform error detection and/or correction on the entries within the guard band and performs invalidations and/or re-fetch of data outside of the guard band.

30. The method as in claim 29 further comprising:
    modifying the guard band based on the current temperature or anticipated changes in temperature.

31. The method as in claim 17 wherein the scrubbing interval is set, at least in part, based on sleep states entered by the apparatus.

32. The method as in claim 31 wherein setting the scrubbing interval based on sleep states comprises waking periodically to scrub the STT memory to retain data and/or switching from scrubbing the STT memory to a timeout.

* * * * *